United States Patent [19]
Moran

[11] Patent Number: 5,822,165
[45] Date of Patent: Oct. 13, 1998

[54] SEQUENCE BASED NETWORK PROTECTOR RELAY WITH FORWARD OVERCURRENT PROTECTION AND ANTIPUMPING FEATURE

[75] Inventor: Steven Alan Moran, Pittsburgh, Pa.

[73] Assignee: Eaton Corporation, Cleveland, Ohio

[21] Appl. No.: 714,539

[22] Filed: Sep. 16, 1996

[51] Int. Cl.⁶ ................................... H02H 3/26
[52] U.S. Cl. ............................. 361/78; 361/76
[58] Field of Search .................. 361/60–72, 77, 361/78, 79, 80, 82, 84, 85–87, 88, 91, 93, 76

[56] References Cited

U.S. PATENT DOCUMENTS

| | | | |
|---|---|---|---|
| 3,947,728 | 3/1976 | Smith | 317/47 |
| 4,587,917 | 5/1986 | Elms | 364/487 |
| 4,972,290 | 11/1990 | Sun et al. | |
| 4,994,934 | 2/1991 | Bouhenguel | 361/71 |
| 5,367,426 | 11/1994 | Schweitzer, III | 361/80 |

Primary Examiner—Ronald W. Leja
Attorney, Agent, or Firm—Martin J. Moran

[57] ABSTRACT

A digital network protector relay samples the polyphase current, network voltage and phasing voltage at 16, and preferably 32, times per cycle so that up to the seventh and fifteenth harmonics, respectively, are eliminated from the sequence calculation used to make trip and close decisions. The relay also provides metering, forward overcurrent protection, and an anti-pumping feature, the latter of which locks the circuit breaker out if a selected number of breaker operations is exceeded during a given time interval. Sequential sampling of the polyphase current and voltages by a single analog to digital converter reduces the cost of the relay. In order to accommodate metering and extraction of the fundamental components of the current and voltages for the sequence calculations, the polyphase current and network voltage are sampled sequentially in a first order for a given number of cycles and then in a second reverse order for the same given number of cycles.

5 Claims, 16 Drawing Sheets

SEQUENCE BASED NETWORK PROTECTOR RELAY WITH FORWARD OVERCURRENT PROTECTION AND ANTIPUMPING FEATURE

BACKGROUND OF THE INVENTION

1. Field of the Invention

This invention relates to network protector relays used to control circuit breakers connecting feeders to low-voltage secondary power distribution networks, and more particularly, to a network protector relay which uses sequence vectors to open the circuit breaker in response to reverse flow of current from the network to the feeder, and to reclose the circuit breaker when the voltage conditions across the breaker are favorable. It also relates to preventing the network protector relay from repeatedly opening and closing the circuit breaker and to providing forward overcurrent protection in the network protector relay.

2. Background Information

Low-voltage secondary power distribution networks consist of interlaced loops or grids supplied by two or more sources of power so that the loss of any one source will not result in an interruption of power. Such networks provide the highest level of reliability possible with conventional power distribution and are normally used to supply high-density load areas such as a section of a city, a large building or an industrial site. Each source is a medium voltage feeder supplying the network and consisting of a switch, a transformer and a network protector. The network protector consists of a circuit breaker and a control relay. The control relay senses the transformer and network voltages and line currents, and executes algorithms to initiate breaker tripping or closing action. Trip determination is based on detecting reverse power flow, that is, power flow from the network to the primary feeder.

Traditionally, network protector relays were electromechanical devices which tripped the circuit breaker open upon detection of power flow in the reverse direction. Such relays were provided with a recloser which closed the circuit breaker following a trip when conditions were favorable for forward current flow upon reclosing of the breaker. The electromechanical network protector relays are being replaced. One type of electronic network protector relay mimics the action of the electro-mechanical relay by calculating power flow. Another type of electronic network protector relay uses sequence voltages and currents to determine direction of current flow for making tripping decisions. Sequence analysis upon which such relays are based generates three vector sets to represent a three-phase voltage or current: a positive sequence vector, a negative sequence vector, and a zero sequence vector. U.S. Pat. No. 3,947,728 discloses a sequence based network protector relay which uses the positive sequence current and positive sequence voltage vectors to make trip decisions.

More recently, a digital sequence based network protector relay has been utilized. This relay samples the current and voltages eight times per cycle. Although only a single analog to digital converter is used so that the currents and voltages are not sensed simultaneously, the eight per cycle sampling rate conveniently provides samples shifted in phase. Calculation of sequence components requires extraction of the fundamental frequency from the currents and voltages. Typical network loads predominantly produce odd harmonics and it is generally considered that harmonics up to about the thirteenth are significant. However, due to the Nyquist effect, the relatively slow sampling rate of eight samples per cycle results in inclusion of only the third harmonic in digital signals from which the fundamental is extracted. Thus, the higher harmonics remain to distort the fundamental signal.

None of the network protector relays have provided forward overcurrent protection. Either of the network conductors are allowed to burn pending a trip of the substation circuit breaker or a separate conventional circuit breaker or fuses are provided.

Also, while current network protector relays provide for reclosing of the relay when the voltage across the circuit breaker is favorable for current flow into the network upon closing, conditions can exist in which reverse current will flow when the network protector circuit breaker is closed thereby setting up a condition in which the recloser "pumps" or continually cycles the circuit breaker.

There is a need therefore for an improved network protector relay.

More particularly, there is a need for a digital network protector relay which takes into account higher harmonics.

There is a specific need for a digital sequence based network protector relay which eliminates the effects of harmonics through at least the seventh harmonic and preferably the thirteenth.

There is a need for a network protector relay which eliminates the need for a separate conventional circuit breaker providing forward overcurrent protection or letting the network conductors burn in the case of a fault.

There is a further need for a network protector relay which eliminates pumping by the recloser.

SUMMARY OF THE INVENTION

These needs and others are satisfied by the invention which is directed to a network protector relay which digitally samples the polyphase current and network voltage at least sixteen times per cycle and uses the digital polyphase current samples and network voltage samples in a digital processor to generate positive sequence current and voltage vectors. Tripping means trips the circuit breaker open in response to a selected relationship between the positive sequence current and voltage vectors indicating flow of current from the network to the feeder. In order to reduce hardware requirements, a single analog to digital converter digitizes the polyphase current and network voltage sequentially, in which case the digital processor includes means adjusting phases angles of the digital polyphase current samples and network voltage samples for such sequential sampling. Preferably, digital sensing means samples the polyphase current and network voltage at least thirty-two times per cycle so that when the fundamental components are extracted for calculating the sequence components, the odd harmonics through the fifteenth are eliminated.

The network protector relay of the invention also performs metering. In order to accommodate the requirement for a fixed sampling sequence for extracting the fundamental components used in the sequence calculations and to provide averaging to reduce the effects of the sequential sampling on metering, the digital sensing means digitally samples the polyphase current and network voltage alternately in a first order for a given number of cycles and then in a second order which is a reverse of the first order for the same given number of cycles. Preferably, the given number of cycles in which the digital sensing means samples alternately in the first order and then in the second order is one so that the currents and voltages are sampled in the first order on even numbered cycles and in the second order on odd numbered cycles.

In accordance with another aspect of the invention, the network protector relay provides forward overcurrent protection by tripping the circuit breaker open in response to current from the feeder bus to the network bus which exceeds a forward overcurrent/time characteristic.

Still another novel aspect of the network protector relay of the invention is an anti-pumping feature. If a predetermined number of breaker operations, that is openings and closings of the circuit breaker are detected within a predetermined time interval, the circuit breaker is locked out in the open condition.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
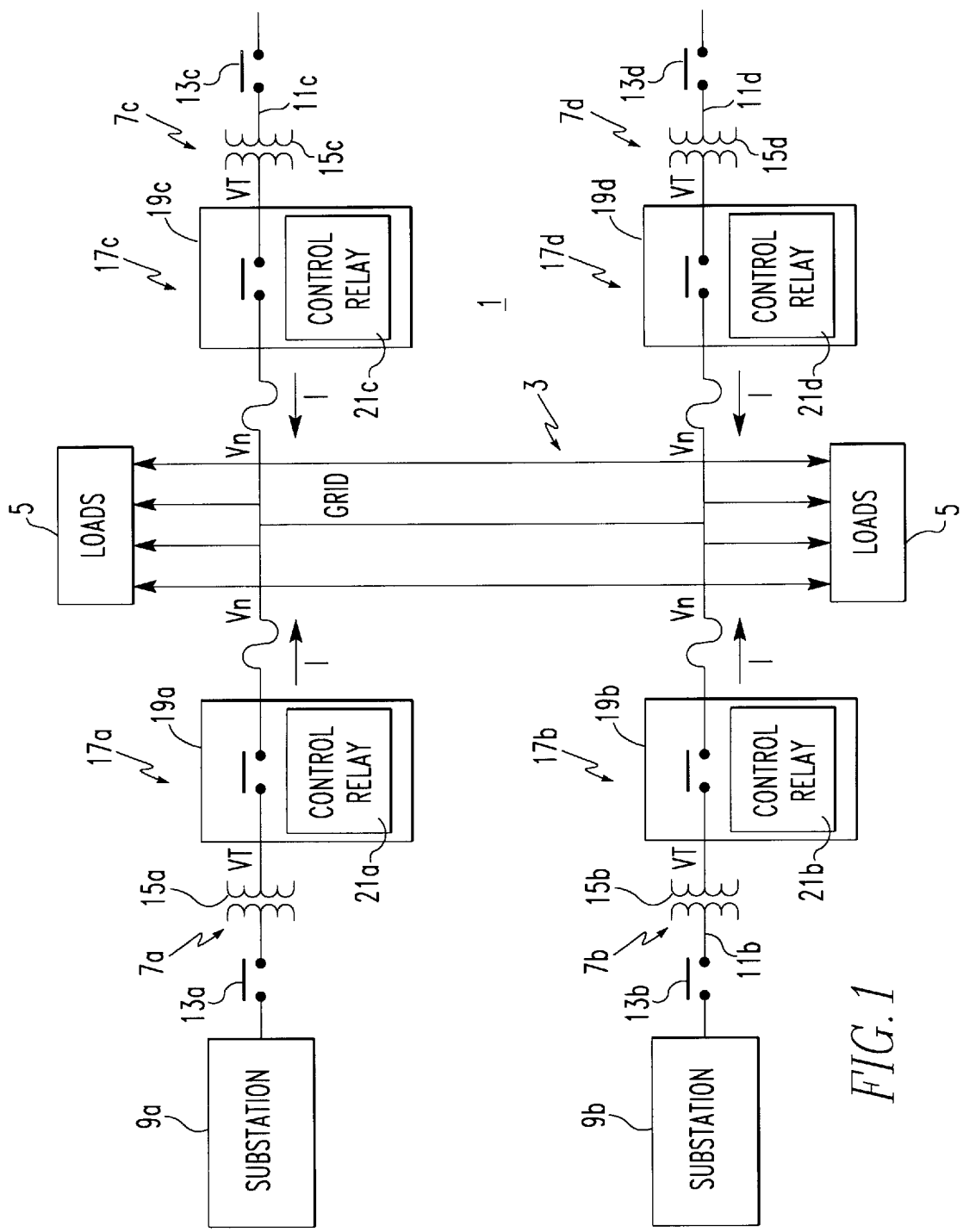
FIG. 1 is a schematic diagram of a low voltage secondary power distribution network sourced by feeders incorporating network protector relays in accordance with the invention.
Figure 7A:
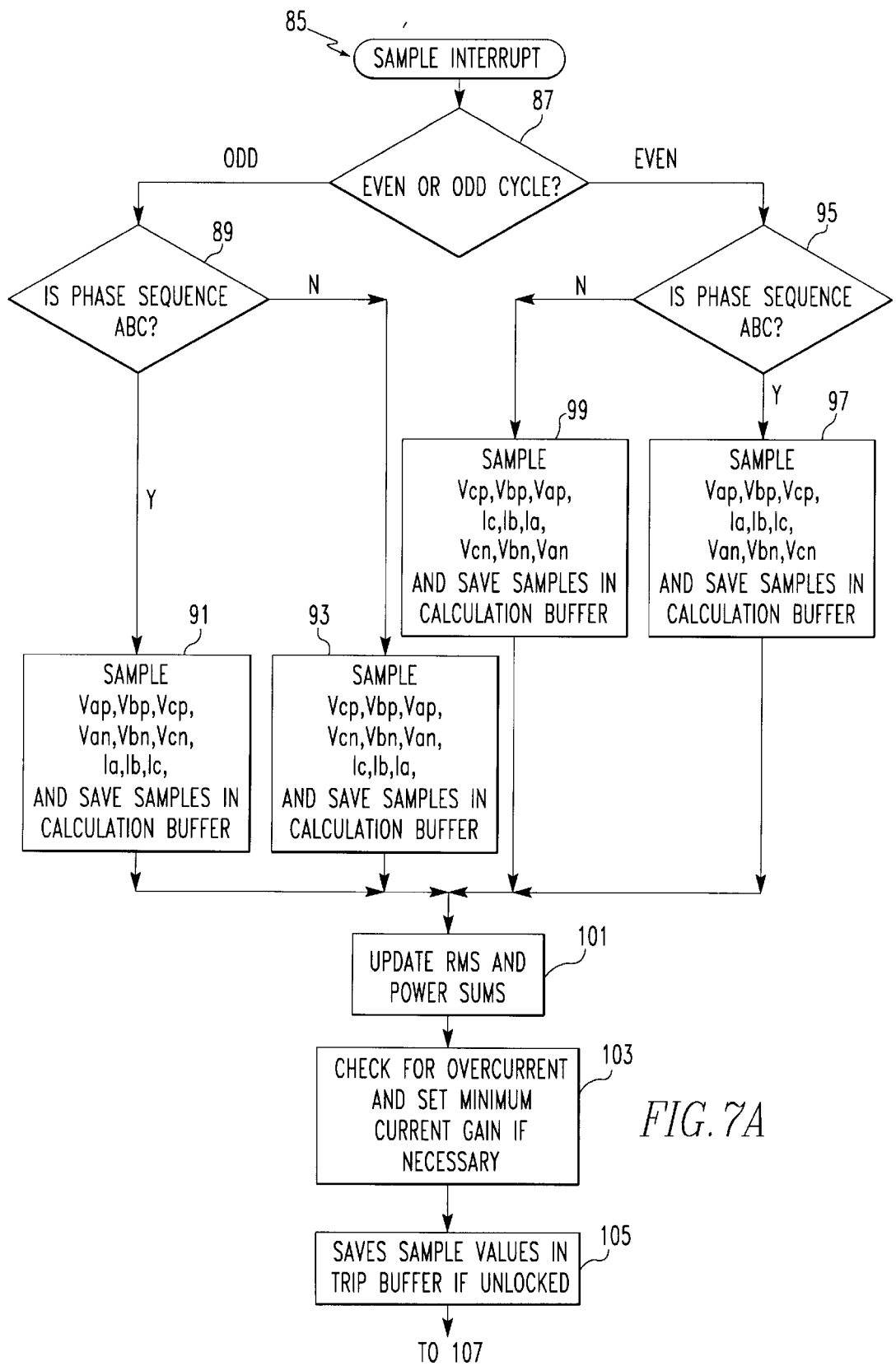
FIGS. 7A–7B illustrate a flow chart of an interrupt routine utilized by the network protector relay in accordance with the invention.
Figure 7B:
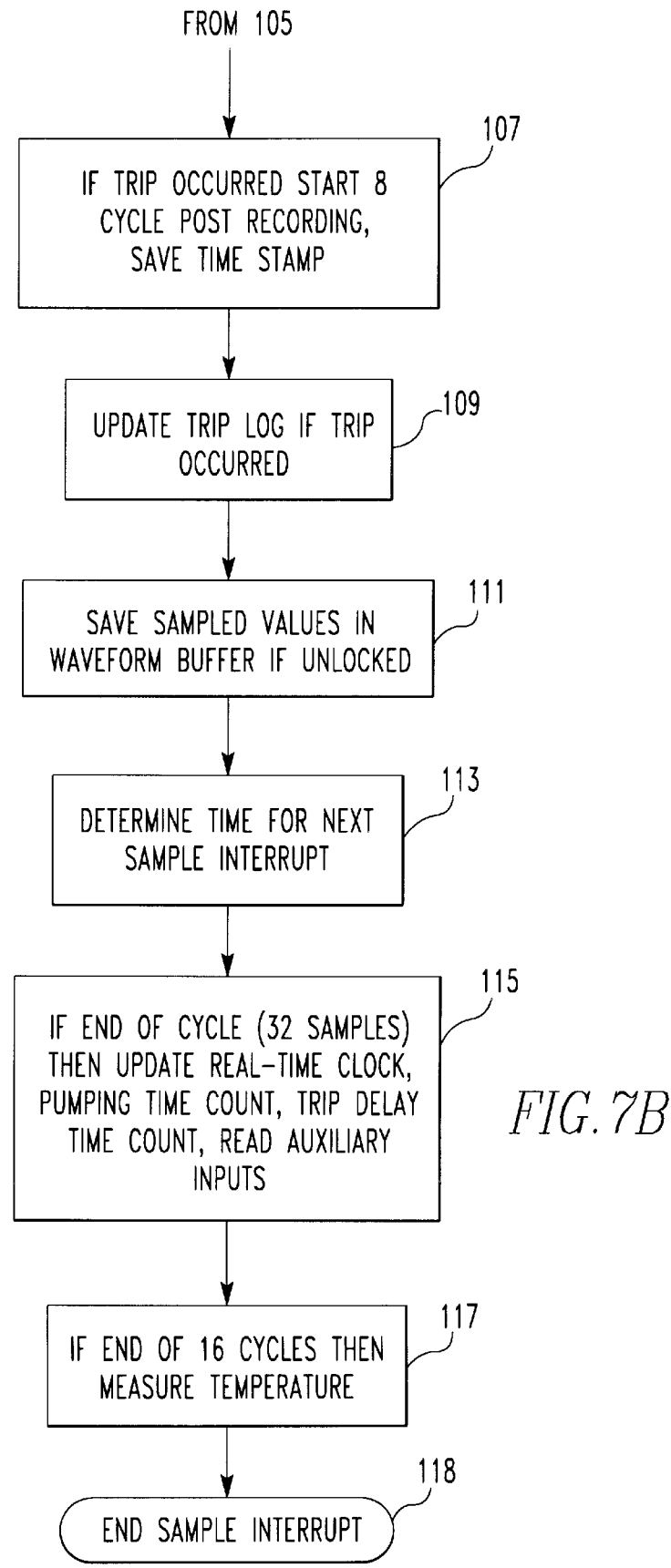

FIG. 1 illustrates a secondary power distribution network system 1 which include a low voltage grid 3 servicing various loads 5. The secondary network or grid 3 is energized by multiple sources in the form of feeders 7A–D. FIGS. 7A and 7B are supplied directly from a substation 9A and 9B. Each of the feeders 7A–D includes a feeder bus 11A–11D, a switch 13A–13D, a feeder transformer 15A–15D and a network protector 17A–17D. The secondary network system illustrated and its components are 3 phase wye or delta connected but has been shown in single line in FIG. 1 for clarity. The network protectors 17A–17D include a network protector circuit breaker 19A–19D and a network protector control relay 21A–21D.

Figure 2:
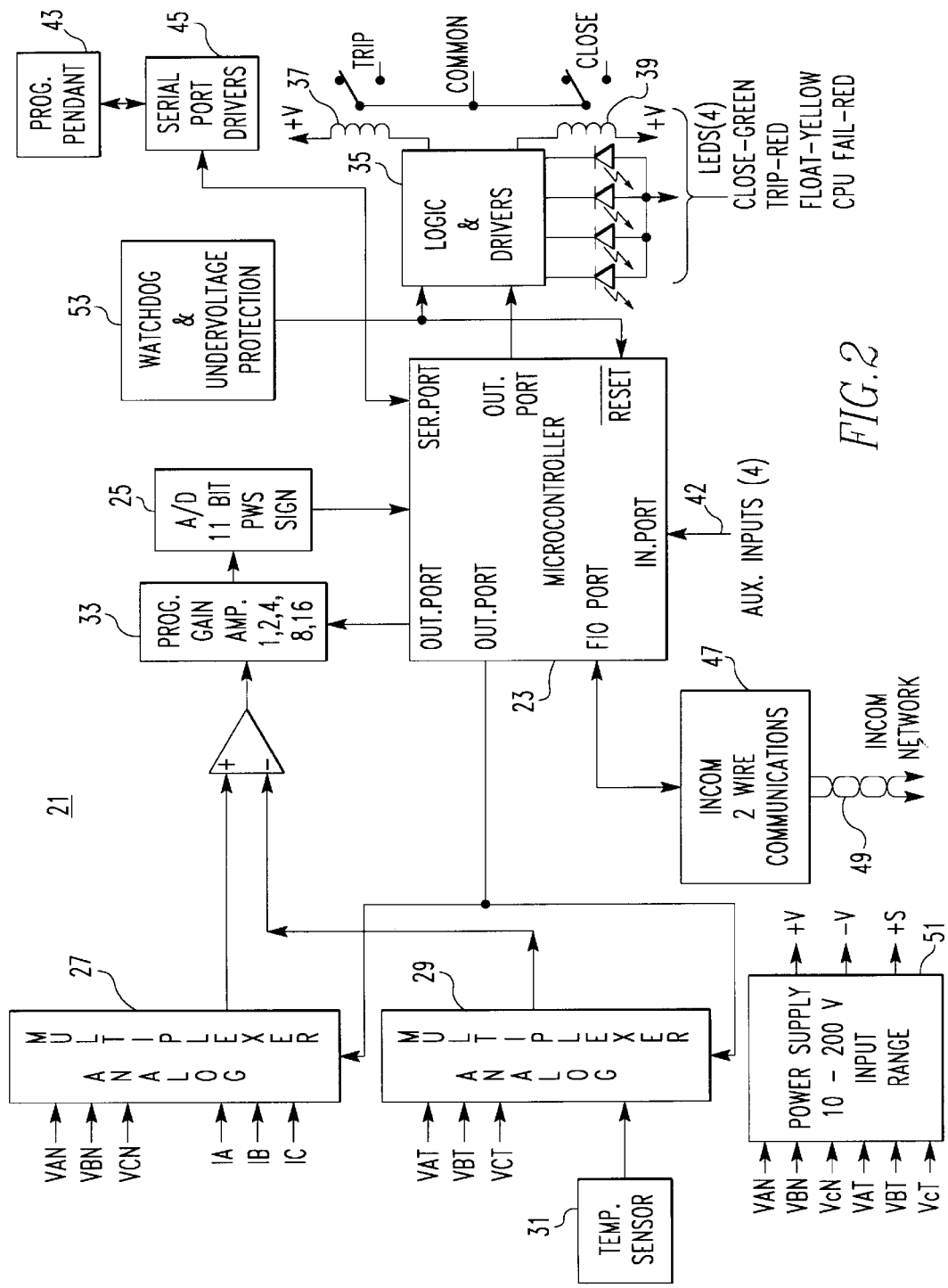
FIG. 2 is a schematic block diagram of a network protector relay in accordance with the invention.

A schematic diagram of the control relays 21 is shown in FIG. 2. The heart of the relay is a microcontroller 23. The microcontroller 23 monitors the network phase to neutral voltages VAN–VCN, the transformer phase to neutral voltages VAT–VCT and the feeder currents IA–IC. A single 11 bit+analog to digital (A/D) converter 25 digitizes the polyphase currents and voltages for input to the microcontroller 23. Since a single A/D converter is used, the voltages and currents are sequentially feed to the A/D converter 25 by analog multiplexers 27 and 29 under the control of the microcontroller 23. The microcontroller 23 also monitors the ambient temperature of the relay as sensed by the analog temperature sensor 31 the output of which is input through the multiplexer 29. As the range of currents can vary widely from reverse magnetization currents of a few ten thousandths per unit to forward overcurrents of about fifteen per unit, a programmable gain amplifier 33 adjusts the gain applied to the analog inputs applied to the A/D converter.

The microcontroller 23 utilizes the sensed currents and voltages in algorithms which generate a trip signal in response to detection of reverse current flowing out of the network 3 into the feeder 7, and also in response to forward currents which exceed a preset current/time characteristic. The trip signal is provided to a logic and driver circuit 35 which energizes a trip relay 37 to trip the circuit breaker 19. The logic and drivers circuit 35 also energizes light emitting diodes (LEDs) 41 to provide a local status indication of the relay. These LEDs indicate that the network protector is closed, tripped, or in a float state and whether the central processing unit (CPU) has failed.

The microcontroller 23 has auxiliary inputs which include a status signal from the circuit breaker 19 indicating whether the contacts of the breaker are opened or closed. A programmable pendant 43 may be connected to the relay through a serial port driver 45 for reading out status and parameters from the relay as well as for setting the parameters in the relay. In addition, the relay includes a communications module 47 for communications with a remote station (not shown) over a communications network 49 which, in the exemplary system, is an INCOM network utilizing a protocol which is proprietary to Eaton Corporation. Any suitable communications network can be used.

The network protector relay 21 has a power supply 51 which can be energized either from the feeder bus or the network bus. A watchdog and under voltage protection circuit 53 protects the microcontroller and controls the CPU fail LED through the logic and driver circuit 35.

Figure 3:
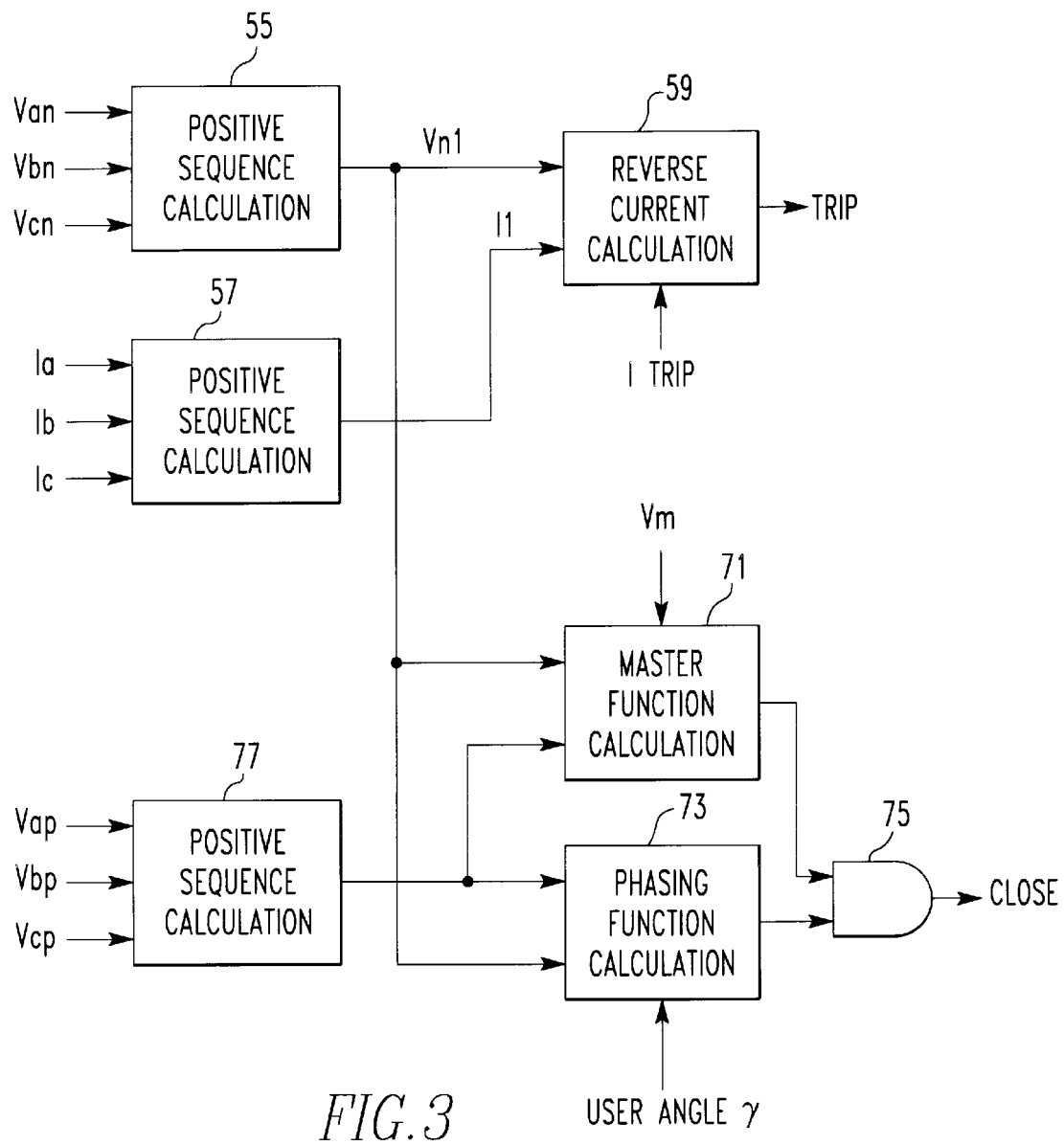
FIG. 3 is a functional diagram of a sequence based network protector relay in accordance with the invention.
Figure 4:
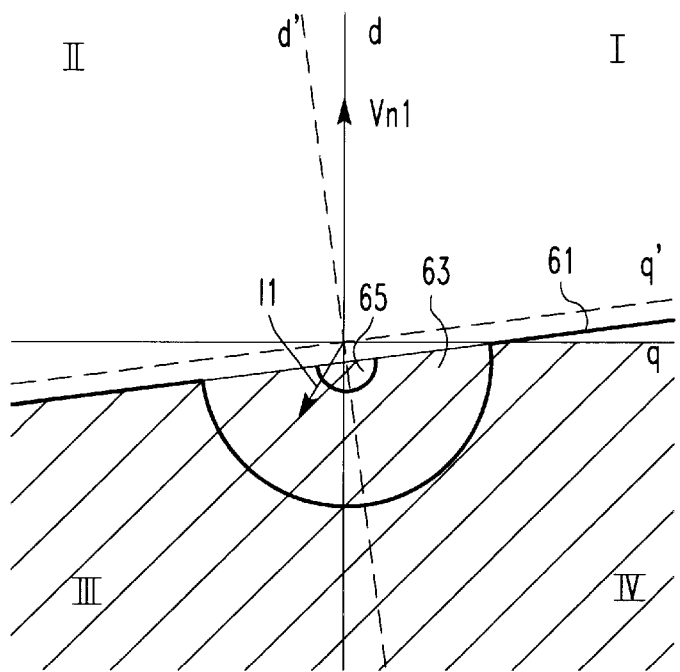
FIG. 4 is a sequence based watt trip curve which can be utilized by the network protector relay of the invention.

As mentioned previously, the relay 21 performs breaker trip and close functions. A functional block diagram of the sequence-based relay is shown in FIG. 3. The breaker trip decision is based on measuring reverse current flow, that is, current flow from the network 3 to the feeder 7. Thus, as seen in FIG. 3, the network positive sequence voltage Vn1 is calculated at 55 from the network phase voltages. The positive sequence current I1 is also calculated at 57 from the phase currents. The reverse current calculation is then made at 59. This process can be visualized by the observing the positions of the positive sequence current and voltage vectors in the complex plane as illustrated in FIG. 4. Real power flow (Watts) from the feeder 7 to the network 3 occurs in quadrants in I and II. On the other hand, real power flow is from the network to the feeder in quadrants in III and IV. A trip command is issued if the positive sequence current vector I1 lies in the trip region illustrated in FIG. 4 by the cross-hatched region. The trip characteristic line 61 is sloped 5° to compensate for the phase shift in the current transformers which measure the currents. If a time delay trip feature is provided, a trip will occur in the region 63 only if the condition persists for the selected time period. This avoids unnecessary tripping in response to temporary reverse current conditions which could be caused for instance by a regenerative load on the network 3. An instantaneous trip is also generated in the small semi-circular region 65. This condition could occur where the feeder was open and there was reverse current magnetizing the secondary of the feeder transformer.

Figure 5:
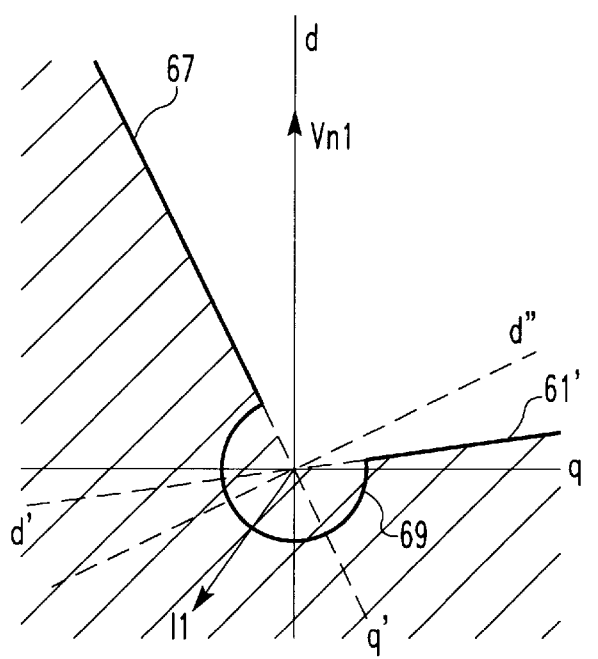
FIG. 5 is a sequence based watt-var curve which can be alternatively utilized by a network protector relay in accordance with the invention.

FIG. 5 illustrates a "watt-Var" trip characteristic for the network protector relay. This trip function includes a Var trip characteristic 67 rotated by 60° in addition to the watt trip characteristic 61'. A positive sequence vector I1 which lies in the region defined by cross-hatching but outside the circular segment 69 results in an instantaneous breaker trip command. If the positive sequence current satisfies the watt or Var curve, but the magnitude is less than the over current limit set by the curved line 69, a trip command is issued only after a user-adjustable time delay.

Returning to FIG. 3, the sequence-based relay generates a close signal if a master function calculation 71 and a phasing function calculation 73 are both satisfied, as indicated by the AND function at 75. Both the master function and the phasing function utilize the positive sequence calculations with the network voltages, and a positive sequence calculation 77 from the phasing voltages Vp. The phasing voltages are the differences between the transformer voltages Vt and the network voltages Vn which is the voltage across the open circuit breaker.

Figure 6:
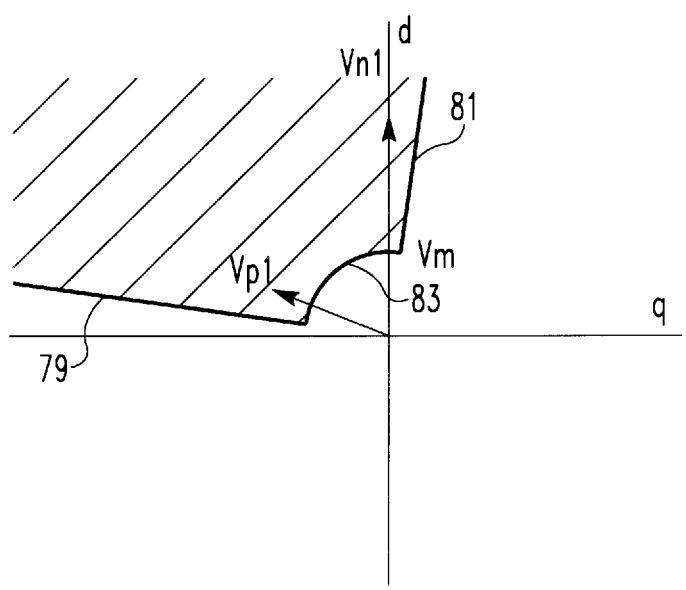
FIG. 6 is a circular reclose characteristic which can be implemented by a network protector relay in accordance with the invention.

The reclose characteristic is illustrated in FIG. 6 where the master characteristic is illustrated by the line 79 while the phasing characteristic is indicated at 81. Vm is a user defined 0° master threshold value. A circular close line 83 allows breaker closing at lighter network loads than if not provided. In order for a close command to be generated, the positive sequence differential voltage Vp1 must have a magnitude greater than a user-defined threshold Vm and an angle which is between user-adjustable blinder angles defined by the cross-hatched area in FIG. 6.

In order to calculate the positive sequence voltages and current vectors the fundamental components of each of the sample voltages and current signals must be extracted. In the exemplary embodiment of the invention the Discrete Fourier Transform is used to extract the fundamental components from the digital samples. Sampling is performed preferably at least sixteen samples per cycle and most preferably at thirty-two samples per cycle. It will be recalled from the discussion above that the odd harmonics are the most predominant in power distribution networks. Sampling at the sixteen sample per cycle rate removes up to the seventh harmonic while sampling at the thirty-two sample per cycle rate eliminates all of the odd harmonics through the fifteen.

The fundamental components of the voltages and currents are then used to determine the positive sequence and negative sequence components which are defined as:

POS. SEQ=0.333 [A+B e^(+j120)+C e^(−j120)]    Eq.(1)

NEG. SEQ=0.333 [A+B e^(−j120)+C e^(+j120)]    Eq.(2)

Where A, B, C are vectors representing the voltages or currents.

Due to the sequential sampling process used in the network protector hardware, the +120 and −120 phase angles must be modified to compensate for the phase shift due to sampling.

The required phase shift can be applied by writing the generalized sequence equation in complex form where the direct and quadrature components are as follows:

DIRECT=AdC1d−AqC1q+BdC2d−BqC2q+CdC3d−CqC3q    Eq.(3)

QUAD.=AdC1q+AqC1d+BdC2q+BqC2d+CdC3q+CqC3d    Eq.(4)

Where coefficients C1, C2, C3 are selected to provide the correct phase angles, including compensation for sequential sampling. These coefficients can be stored in a table for use by the microprocessor in making the sequence calculations.

In addition to tripping the circuit breaker on reverse current, the network protector relay 19 of the invention also incorporates forward overcurrent protection, that is, if the current flowing into the network exceeds defined limits. For this purpose, conventional overcurrent/time characteristics can be utilized. This can include both instantaneous and delayed trip functions, the latter of which can be used to provide coordination with circuit breakers in the secondary network.

The network protector relay 19 of the invention also provides metered values of a number of parameters. For instance, RMS and peak values of the currents and voltages, watts, VARs, power factor and so forth are calculated and can be transmitted location. The phase shifts resulting from the sequential sampling of the currents and voltages can lead to errors in these metered parameters. It is known to reverse the sequence of sampling on alternate samples in order to average out these errors. However, it is essential for utilizing the Fast Fourier Transform for extracting the fundamental components of the currents and voltages for calculating the sequence components that the sampling sequence remain constant for each calculation (i.e. throughout each cycle). In order to accommodate both of these requirements, the relay of the present invention sequentially samples the currents and voltages in a first order for a given number of cycles and then samples them in a second reverse order for the same give number of samples. Preferably, the given number cycles is one so that during even numbered cycles the currents or voltages are sampled in one order such as the first order, and during the odd numbered cycles they are sampled in the other or second order. With this arrangement, both the demands of the Fast Fourier Transform for a constant sampling sequence during each cycle, and the demands for reversing the sequence for averaging out errors due to phase differences are also satisfied.

Another novel feature of the network protector relay of the invention prevents pumping of the circuit breaker or repetitive opening and closing. In accordance with the invention, the operations of the circuit breaker are counted and if the circuit breaker is opened and closed more than a predetermined number of times within a selected time interval, for instance five times within thirty seconds, the circuit breaker is locked out open. The relay must then be reset manually such as over the communications network 49 or by the pendant 43, or automatically after a predetermined time delay, such as for example a half-hour.

Figure 8A:
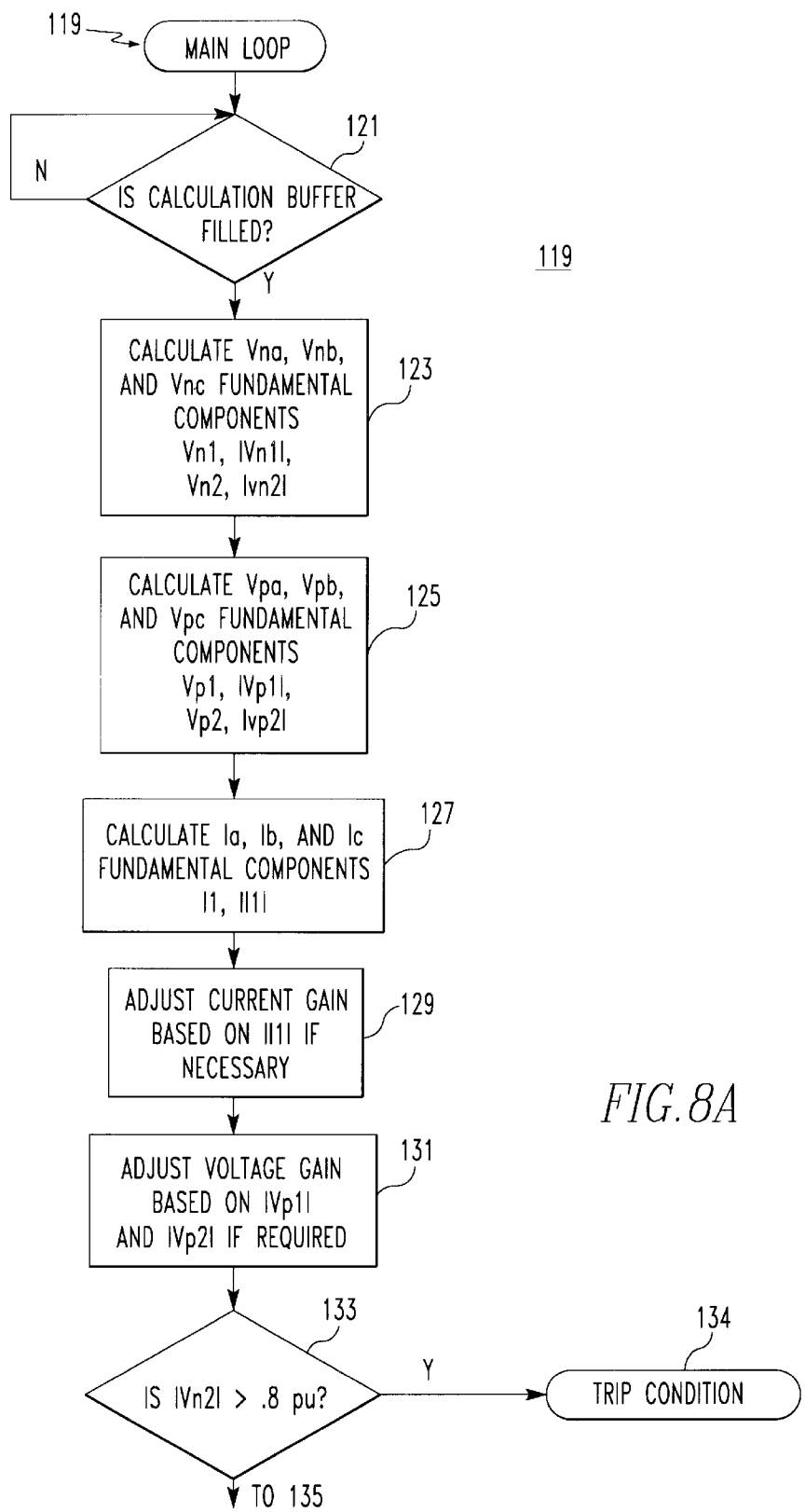
FIG. 8A–8H illustrate a flow chart of the main loop routine used by the network protector relay of the invention.
Figure 8B:
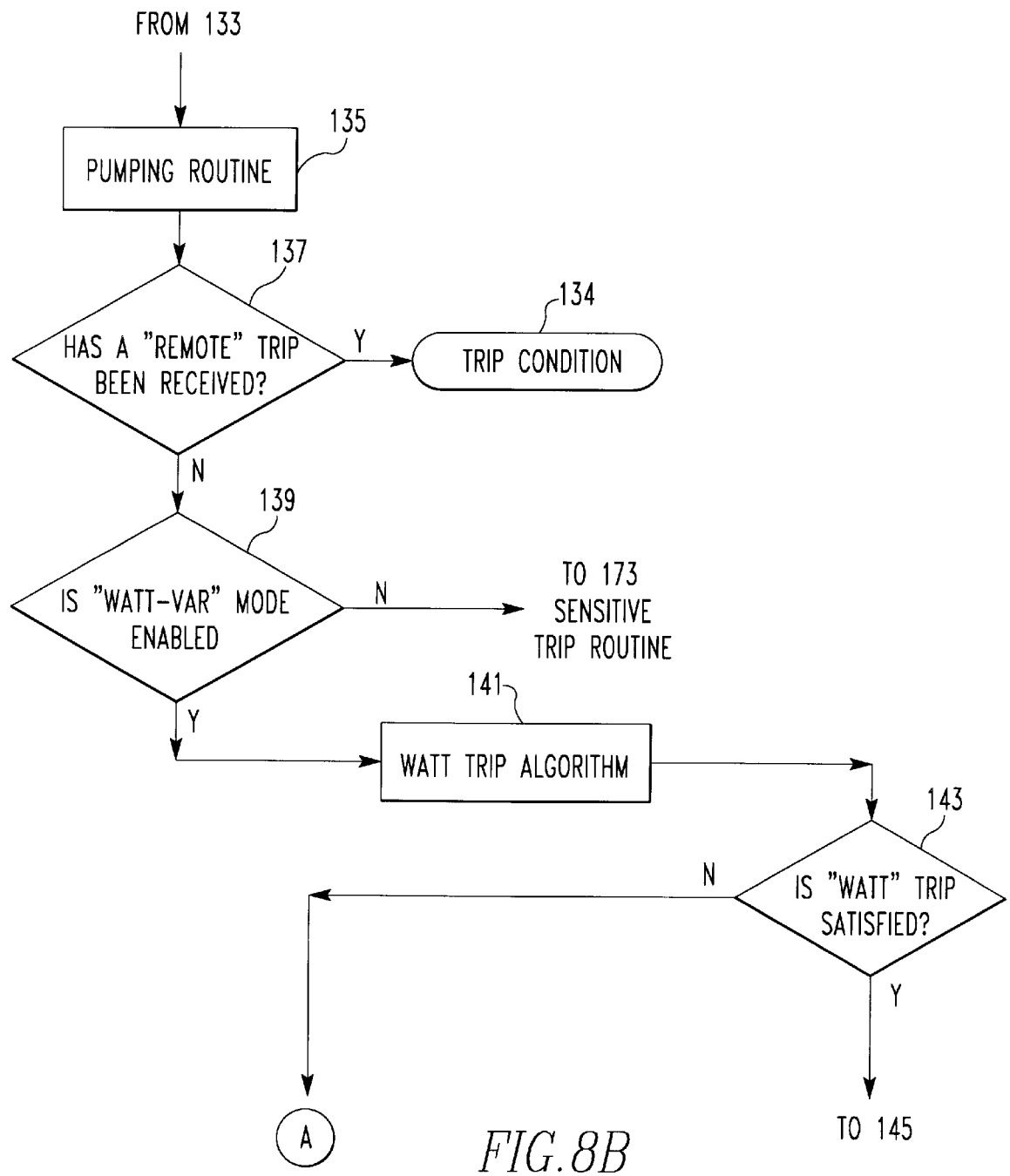
Figure 8C:
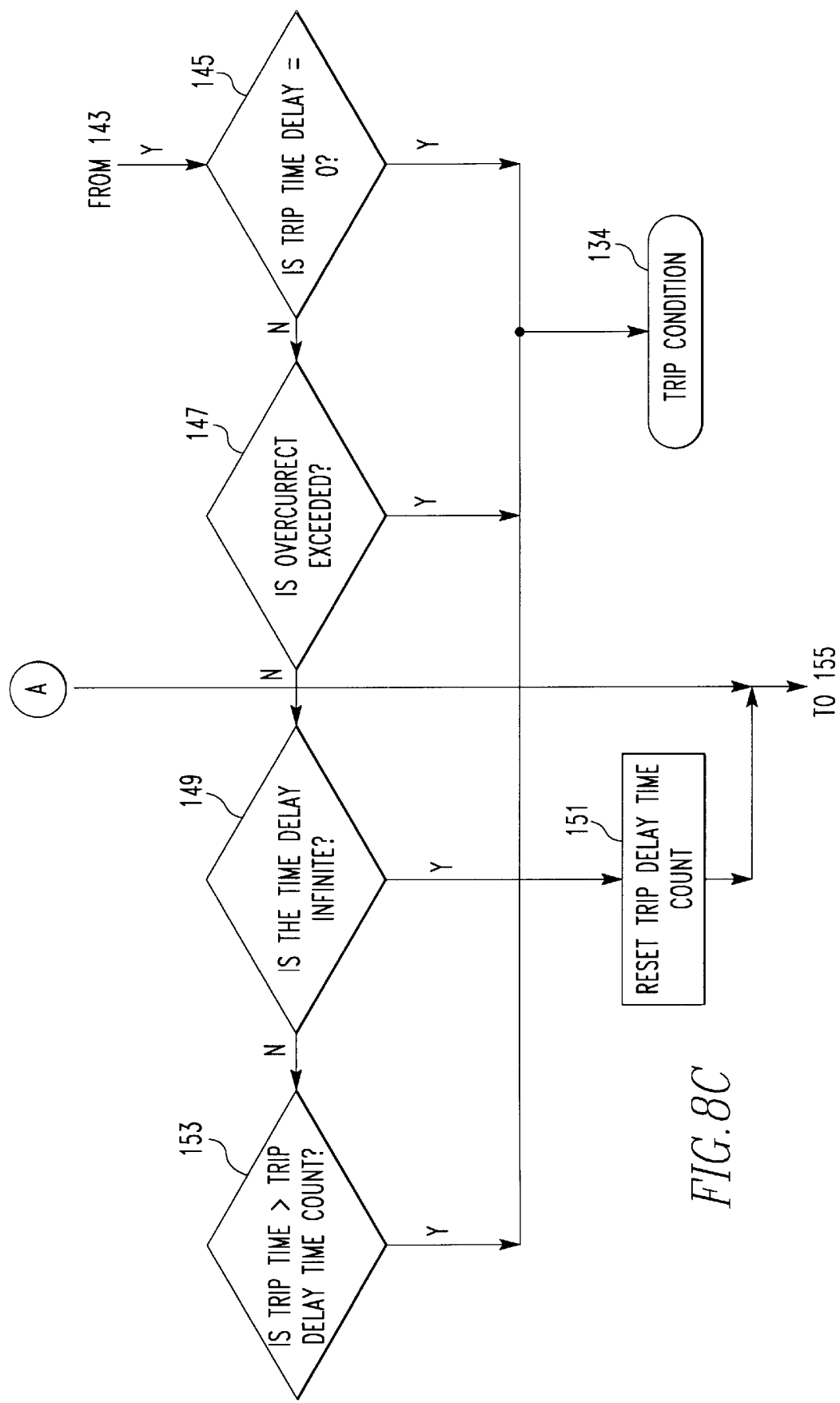
Figure 8D:
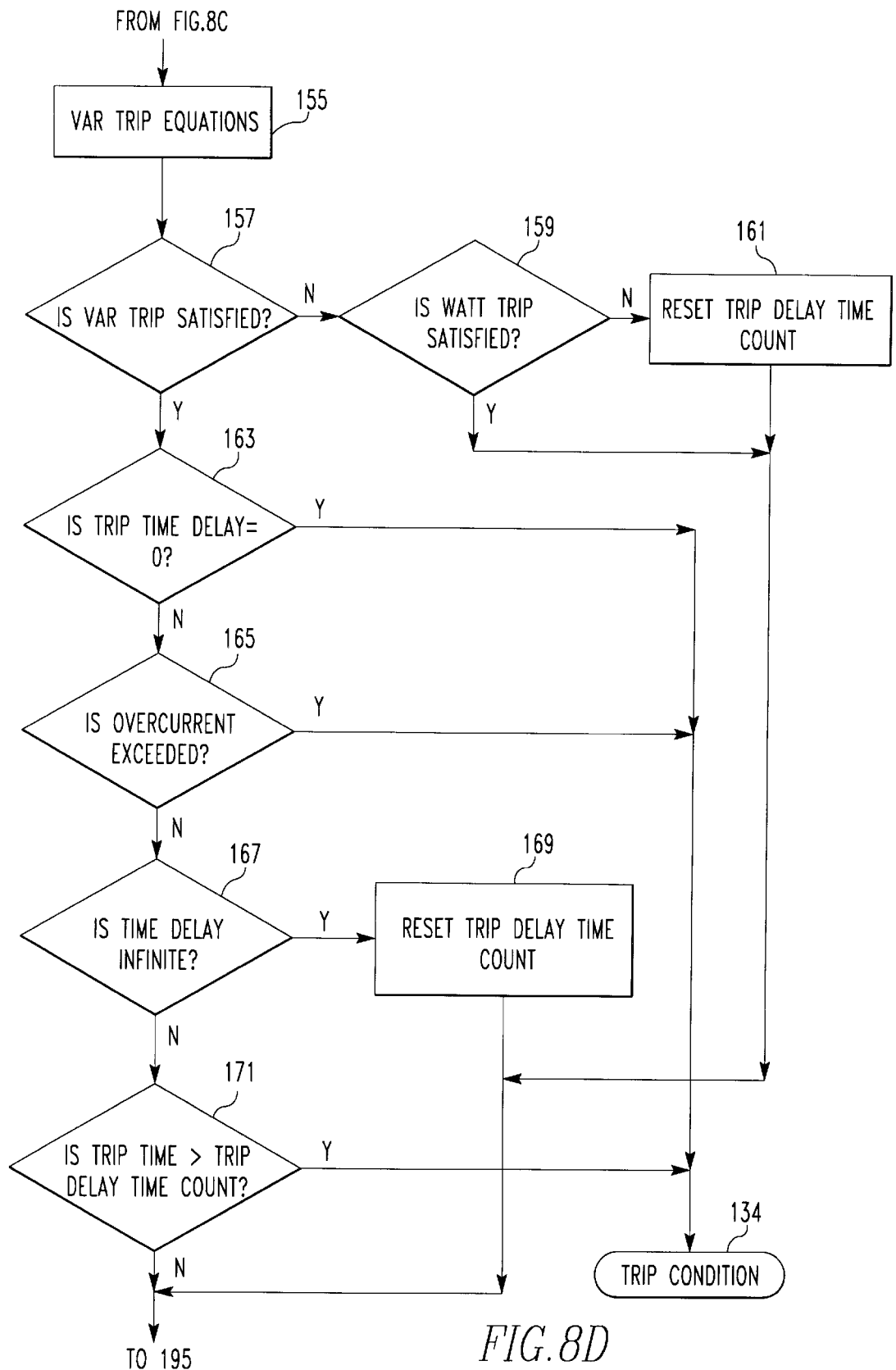
Figure 8E:
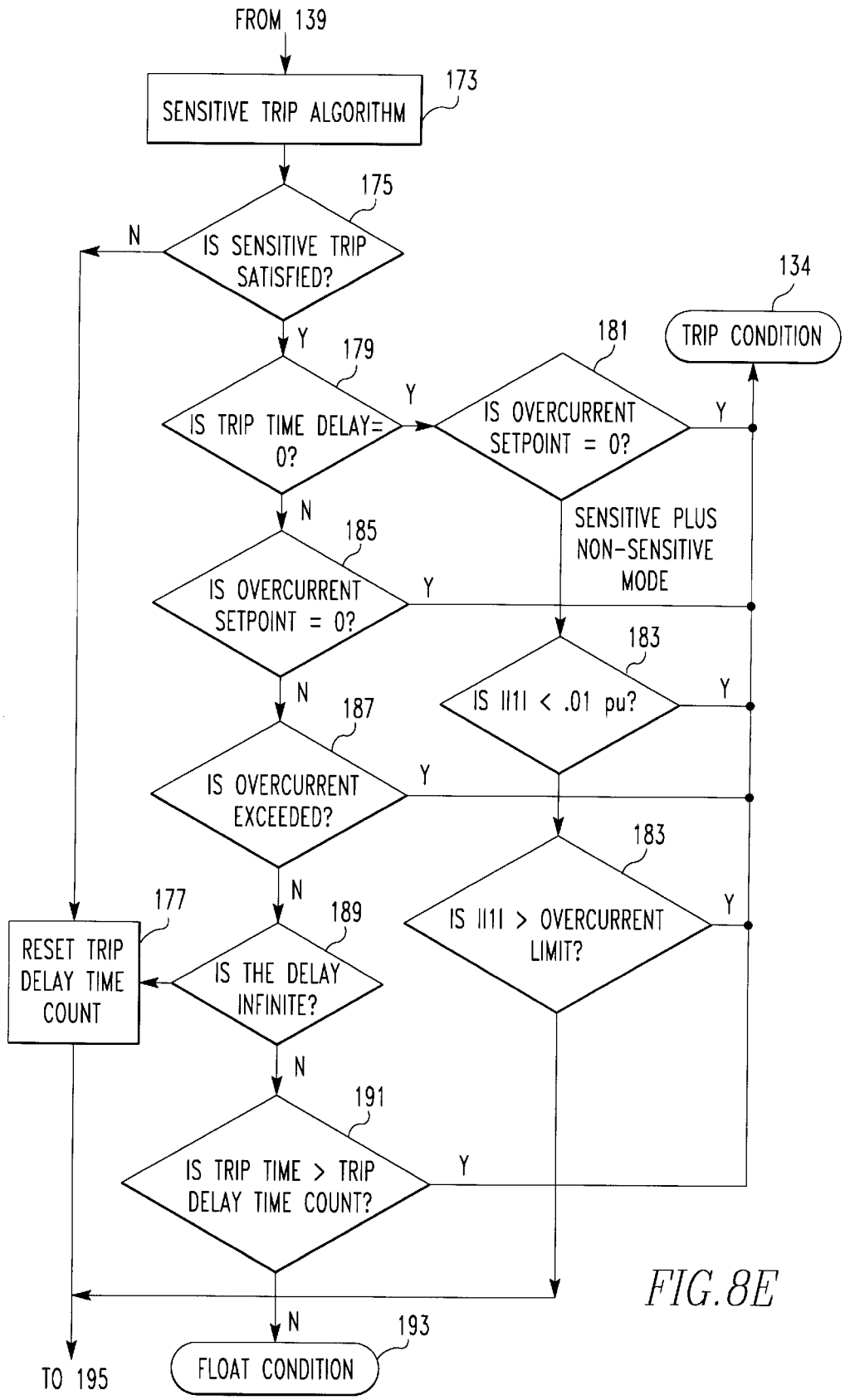
Figure 8F:
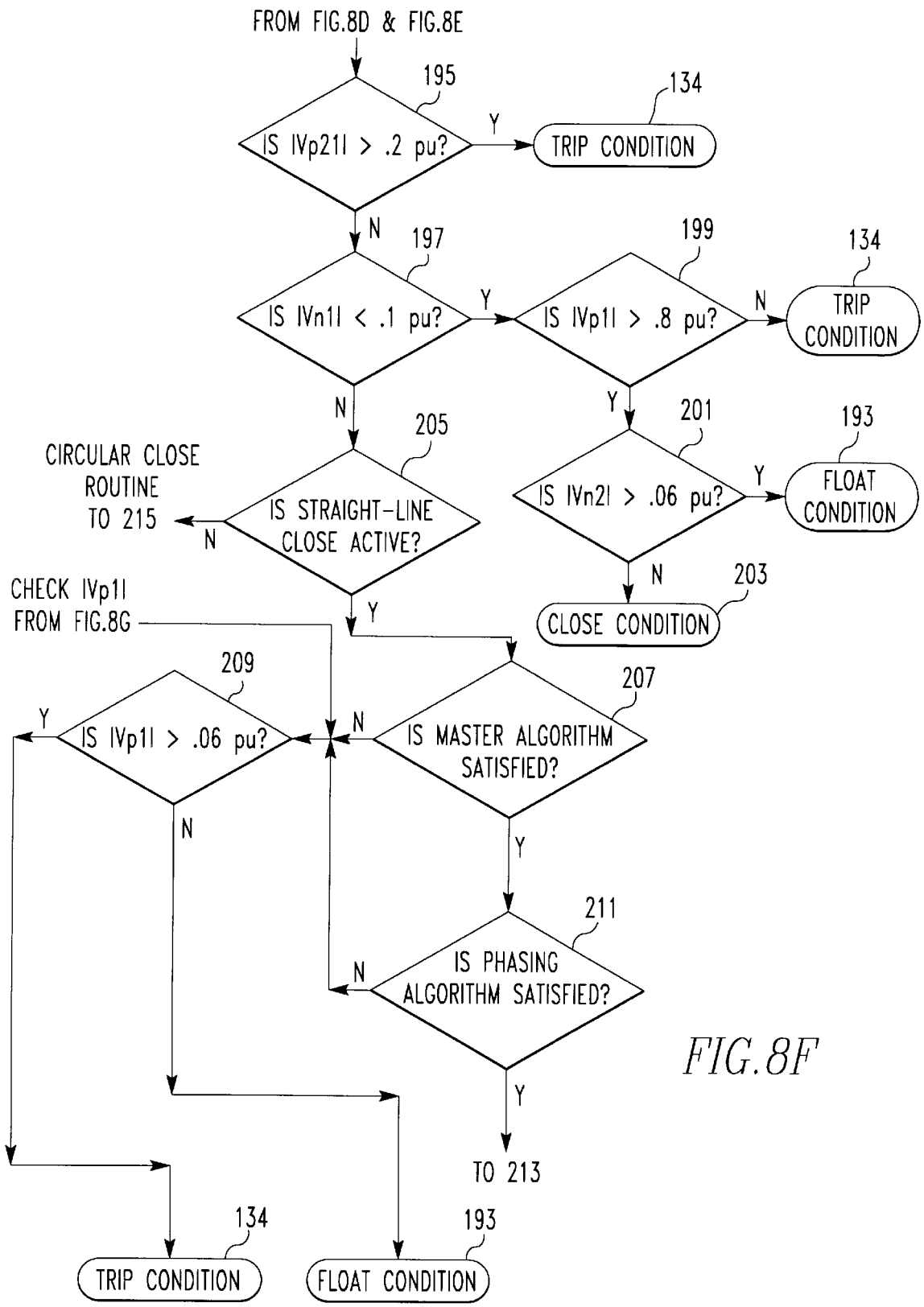
Figure 8G:
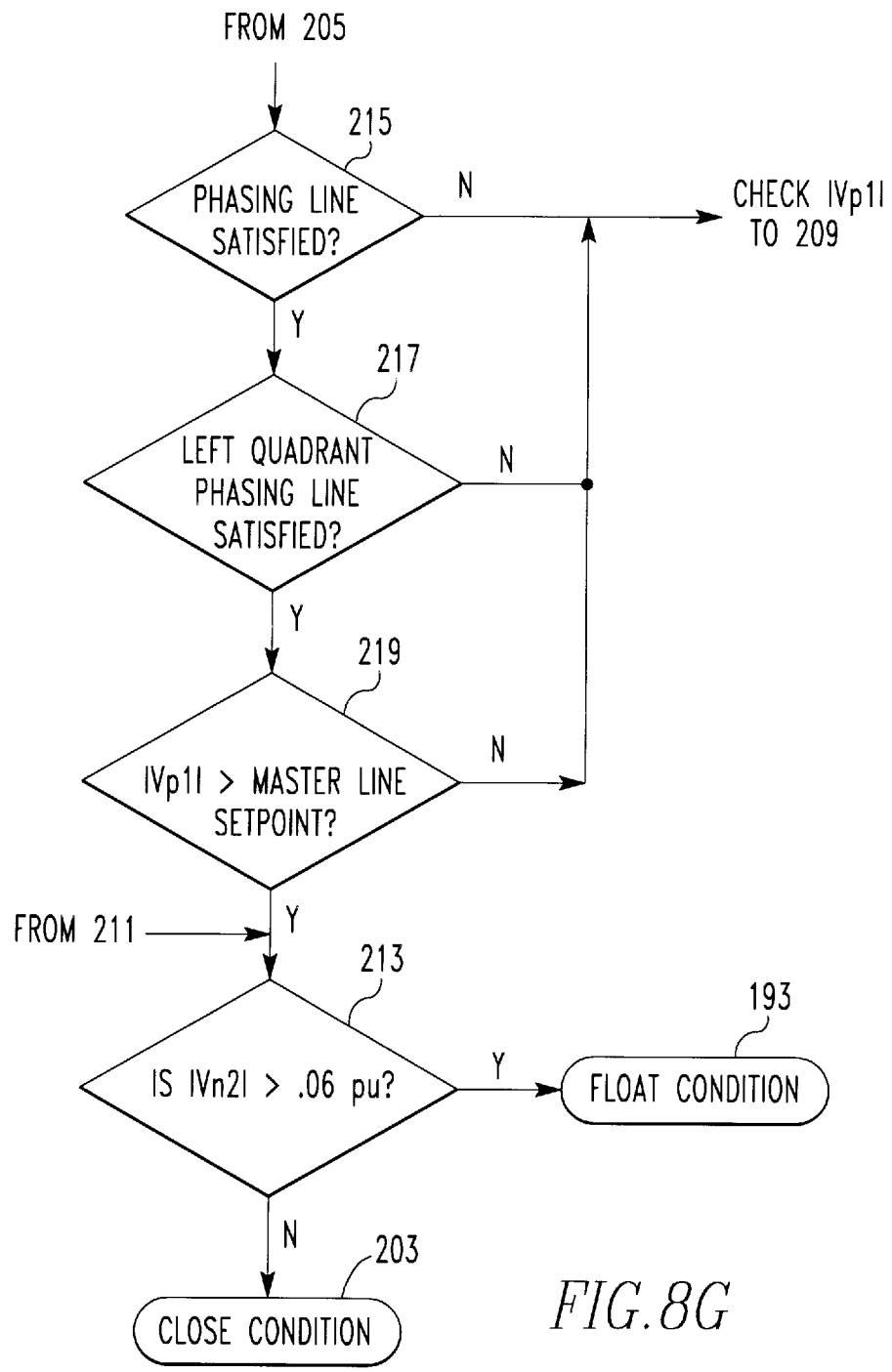
Figure 8H:
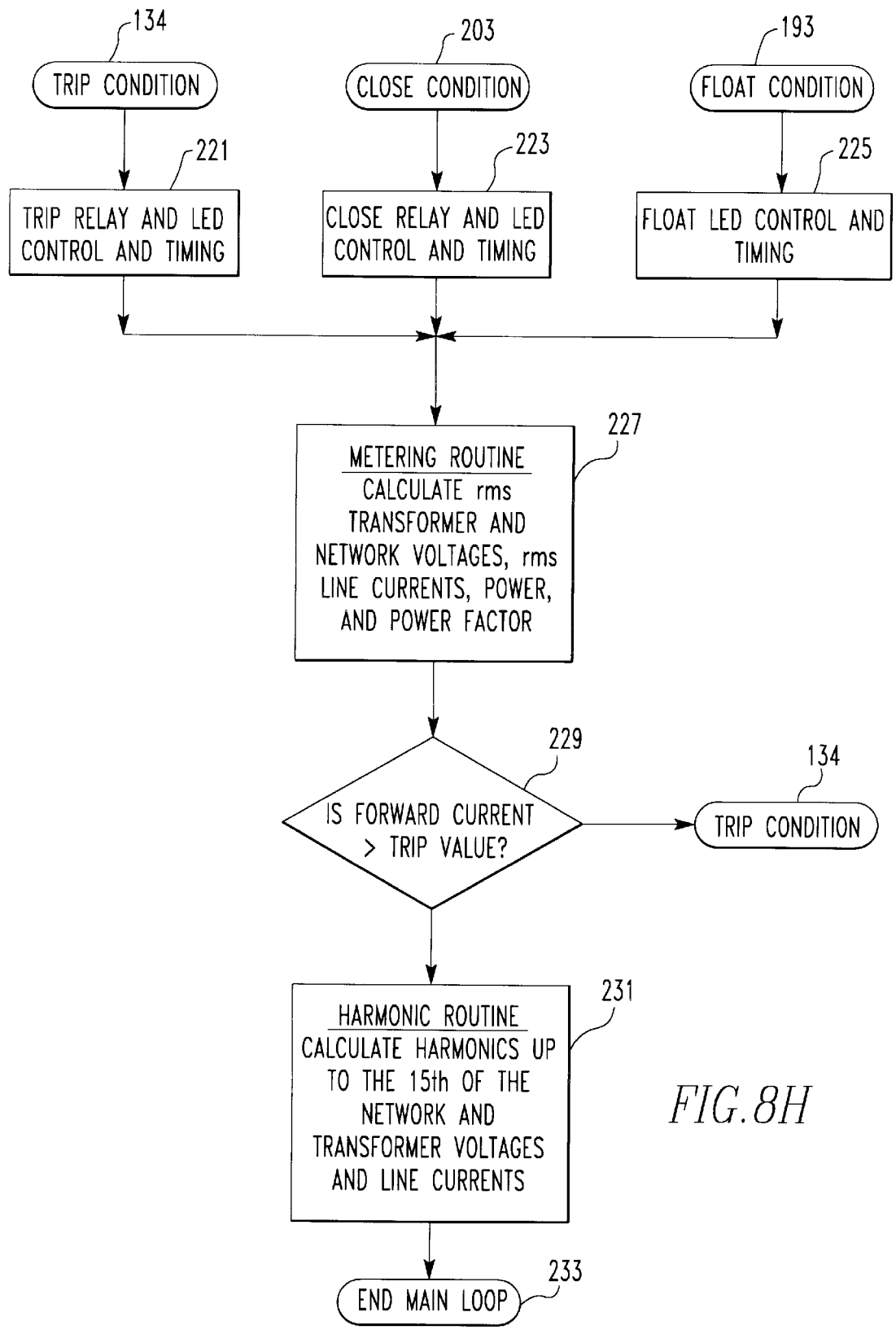
Figure 9:
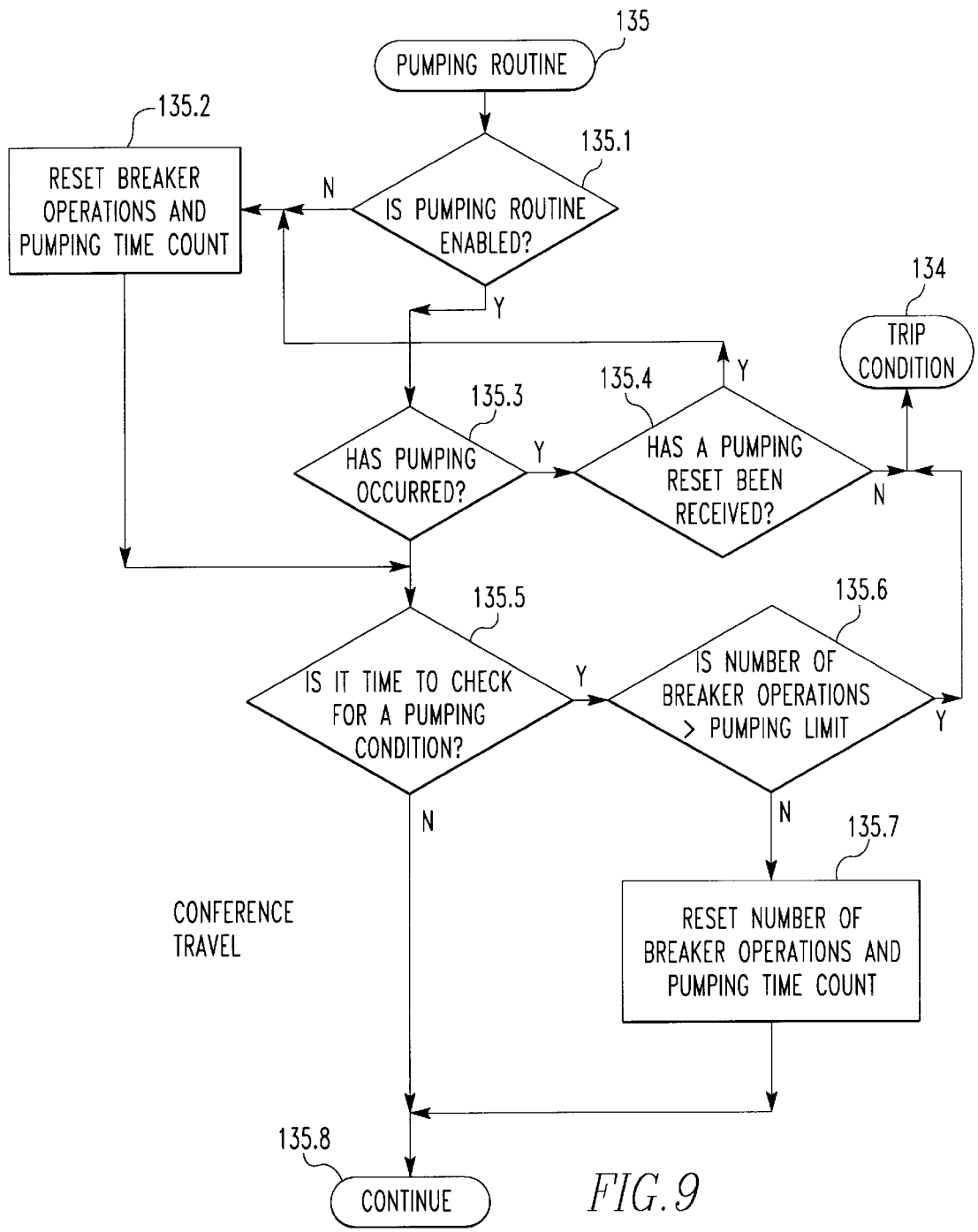
FIG. 9 is a flow chart of the pumping routine used by the network protector relay in accordance with the invention.

Routines run by the microcontroller 23 in implementing the invention are illustrated in FIGS. 7–9. FIGS. 7A and 7B illustrate the sample interrupt routine 85 which in the exemplary embodiment of the invention is run 32 times per cycle. As indicated at 87, on odd cycles, if the user has indicated that the phase sequence is ABC at 89 the samples are taken in a first order of phasing voltages, network voltages and currents in accordance with the ABC rotation as indicated at 91. The samples are saved in a calculation buffer. If the user indicates that the phase rotation is CBA at 89, then the samples are still taken in the first order of phasing voltages, network voltages and currents, but in the phase sequence CBA as indicated at 93.

On even cycles as indicated at 87, the sampling is done in a second reverse order in which the currents are sampled before the network voltages, although the phasing voltages are still sampled first. If the phase sequence is ABC as indicated at 95, then the samples are taken in the second order and in the phase sequence ABC as indicated at 97.

With the opposite phase sequence, the samples on even cycles are still taken in the second order, but in the phase sequence CBA as indicated at 99.

After sampling, the RMS and power sums are updated at 101. Next, the gain set by the programmable gain amplifier 33 is adjusted at 103 to prevent saturation of the current inputs. The sample values are then saved in a trip buffer if the buffer has been released as indicated at 105. If a trip occurred, capture of samples for eight cycles following the trip is indicated with a time stamp for future analysis at 107. Also, if a trip occurred, the trip is logged at 109 and the sample values are saved in a waveform buffer, if the buffer has been unlocked after recording a previous trip, all as indicated at 111.

The next task in the sample interrupt routine 85 is to set the time for the next sample interrupt at 113. If a full cycle of samples has been collected, the real time clock is updated and, the timer for the pumping is indexed along with the trip delay time count at 115. In addition, the auxiliary inputs are read at this point. Finally, the temperature is sampled at 117 before the routine is exited at 118.

FIGS. 8A–8H illustrate the main loop routine 119. The samples gathered during each cycle as indicated at 121 are used to calculate the fundamental components of the network phase to neutral voltages which in turn are used to calculate the positive sequence network voltage Vn1 and its magnitude, and the negative sequence network voltage and its magnitude at 123. Similarly, calculations are made at 125 for the phasing voltages, which it will be recalled are the differences between the transformer voltages and the network voltages. The fundamental components of the current are calculated at 127 and used to calculate the positive sequence current and its magnitude. The current gain of the input amplifier 33 is adjusted at 129 if necessary. Also, the gain for the voltage samples is adjusted at 131 if necessary based on the magnitudes of the positive and negative sequence phasing voltages. If a check of the magnitude of the negative sequence network voltage indicates improper wiring at 133, a trip condition 134 is generated.

Turning to FIG. 8B, the pumping routine which is illustrated in FIG. 9 is called at 135. Next, if a remote trip has been received over the communications network 49, as determined at 137, a trip condition 134 is generated. Otherwise, a determination is made at 139 as to whether the "watt-var" mode has been enabled. If not, the program transfers to the sensitive trip routine at 173 in FIG. 8E. When the "watt-var" mode is enabled, the watt trip algorithm is called at 141 to determine if the positive sequence current is below the watt curve in FIG. 5. If it is as indicated at 143, and turning to block 145 in FIG. 8C, if the trip delay time is set to zero, then a trip condition 134 is generated. Even if the delay time is not zero, if the positive sequence vector is in the instantaneous trip region then a trip is generated at 147. If an infinite time delay has been selected at 149, then the delay time count is reset at 153. However, if the positive sequence current is in the circular zone and the delay time has expired, a trip is generated at 153.

If there is no "watt" trip, the VAR trip equations are implemented at 155 in FIG. 8D. If the VAR trip is not satisfied at 157 and the watt trip is not satisfied as checked at 159, then the trip delay time count is reset at 161. On the other hand, if the Var trip is satisfied at 157 and the trip delay was set at zero as determined at 163, a trip condition 134 is generated. Even if the trip delay time was not zero, but the overcurrent was exceeded as determined at 165, a trip is generated. If the overcurrent was not exceeded and the time delay was set to infinite as determined at 167, the delay time count is reset at 169. As in the case of the watt trip, if the trip time has been exceeded at 171, a trip condition 134 is created.

If the watt-var mode was not enabled at 139 at FIG. 6B, the sensitive trip routine is called. This routine which is shown in FIGS. 8E, implements the characteristic shown in FIG. 4. Initially the sensitive trip algorithm is run at 173. If the sensitive trip is not satisfied at 175, that is, the positive sequence current vector is not in the cross-hatched regions of FIG. 4, then the trip delay time count is reset at 177. On the other hand, if the sensitive trip is satisfied at 175 and the trip delay time has been set to 0 at 179 and the overcurrent set point is 0 as determined at 181, then a trip condition 134 is generated. If the sensitive plus non-sensitive mode has been selected, which includes the small semi-circular instantaneous trip region 65 in FIG. 4 as indicated by a "no" at block 181, a trip condition 134 is generated if the positive sequence current is within this region as indicated at 183. Trip condition 134 is also generated if the positive sequence current is more than the overcurrent limit, i.e. beyond the region 65, as indicated at 183.

Returning to block 179, if the time delay is other than zero and the overcurrent set point is equal to zero, as indicated at 185, a trip condition 134 is generated. A trip condition 134 is also generated if the overcurrent is exceeded at 187. If not, and the delay is infinite as determined at 189, the trip delay is reset at 177. Otherwise a check is made at 191 to see if a delayed trip has been generated. If the time has not expired at 199 a float condition is indicated at 193.

FIG. 8F begins tests to determine if an open circuit breaker can be closed. If the negative sequence phasing voltage is high at 195, this indicates improper wiring such as crossed phases on the transformer or the network and therefore a trip condition is generated at 134. If the network is de-energized as indicated by a low network positive sequence voltage at 197 but the positive sequence phasing voltage is not more than 0.8 pu at 199 indicating low feeder voltage, a trip condition 134 also generated. If the feeder voltage is adequate, a final check is made at 201 of the network negative sequence voltage. If the negative sequence voltage is more than 0.06 pu, there is a wiring problem such as crossed phases and a float condition 193 is generated. If the negative sequence network voltage is sufficiently high at 201, a close condition 203 is generated.

If it is determined at 197 that the network is energized, and the straight line closing characteristic is selected at 205, a check is made at 207 to see if the master algorithm is satisfied. If not, a check is made of the positive sequence phasing voltage at 209 for wiring errors. If there are wiring errors, a trip condition 134 is indicated, otherwise a float condition 193 is entered. Returning to block 207, if the master algorithm is satisfied and the phasing algorithm is satisfied at 211, a wiring check is made at 213 in FIG. 8G, and if none is found, a close condition 203 is generated. Otherwise the float condition 193 is entered. If the circular close routine rather than the straight line close routine had been selected at 205 in FIG. 8F, then the phasing line is checked at 215 in FIG. 8G. If the phasing line is satisfied, the left quadrant phasing line is also satisfied at 217, and the positive sequence phasing voltage magnitude is greater than the master line set point at 219, then a close condition 203 is indicated as long as the magnitude of the negative sequence network voltage is satisfactory at 213. If any of the conditions at 215, 217 or 219 are not satisfied, the routine transfers to block 209 on FIG. 8F to determine whether the trip condition or float condition should be entered.

Turning to FIG. 8H, if a trip condition 134 has been generated, the trip relay 37 is energized at 221 and toggle on and off until the circuit breaker opens. In addition the red trip LED 41 is turned on and flashed as the relay toggles. If a close condition 203 was generated, the close relay 39 is energized and the green LED 41 is turned on for a minimum of 4 seconds unless interrupted by a trip at 223. If on the other hand, a float condition 193 was generated, the yellow float LED 41 is turned on and flashed at 225. Next, the metering routine is called at 227. As mentioned, various parameters are calculated and made available for transmission over the communications network 49 to a remote station. Following this, the forward overcurrent protection routine is run and if the forward current exceeds the trip value as indicated at 229, a trip condition 134 is generated. Finally, a harmonic routine is run at 331. This routine calculates harmonics up to the fifteenth for the network and transformer voltages and line currents. The main loop is then exited at 233.

FIG. 9 illustrates the flow chart for the pumping routine 135 which was called in FIG. 8B. If the pumping routine has not been enabled as indicated at 135.1 then a counter which maintains a count of breaker operations (openings and closings) and the pumping timer are reset at 135.2. If the pumping routine has been enabled, and the pumping limit has previously been exceeded as detected at 135.3 and has not been reset as determined at 135.4, a trip condition 134 is maintained to keep the circuit breaker locked out. If there is no existing block, the timing interval for pumping has expired as indicated at 135.5, and the number of breaker operations exceeds the pumping limit as indicated at 135.6, then the block is set by establishing the trip condition 134. If the limit of breaker operations has not been exceeded by the conclusion of the pumping time interval, the number of breaker operations and pumping time count are reset at 135.7 and the routine continues by returning to the calling routine at 135.8.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A network protector relay for controlling a circuit breaker connected between a polyphase feeder bus and a polyphase network bus, said network protector relay comprising:

digital sensing means digitally sampling polyphase current flowing through said circuit breaker and polyphase network voltage on said network bus at least sixteen times per cycle to generate digital polyphase current samples and digital polyphase network voltage samples;

digital processor means comprising means for generating positive sequence current and voltage vectors from said digital polyphase current samples and digital polyphase network voltage samples, and means tripping said circuit breaker open in response to a selected relationship between said positive sequence current and voltage vectors indicating flow of current from said polyphase network bus to said polyphase feeder bus above a predetermined threshold;

wherein said digital sensing means digitally samples said polyphase current and said polyphase network voltage sequentially and wherein said digital processor means includes means adjusting phase angles of said digital polyphase current samples and digital polyphase network voltage samples for such sequential sampling; and wherein said digital processor means includes means deriving from said digital polyphase current samples and said digital polyphase voltage samples metered parameters, and wherein said digital sensing means digitally samples said polyphase current and said polyphase network voltage alternately in a first order for a given number of cycles and then in a second order which is a reverse of the first order for said given number of cycles.

2. The network protector relay of claim 1 wherein said given number of cycles in which said digital sensing means samples alternately and in said first order and said second order is one so that said digital sensing means samples said polyphase currents and polyphase network voltage in said first order on even numbered cycles and in said second order on odd numbered cycles.

3. The network protector relay of claim 2 wherein said digital sensing means samples said polyphase current and said polyphase network voltage at least thirty-two times per cycle.

4. The network protector relay of claim 1 wherein said digital processor means includes means tripping said circuit breaker open in response to polyphase current flowing from said polyphase feeder bus to said polyphase network bus which exceeds a forward overcurrent/time characteristic.

5. The network protector relay of claim 4 wherein said digital sensing means further includes means digitally sampling a polyphase phasing voltage across said circuit breaker to generate digital polyphase phasing voltage samples, and wherein said digital processing means includes reclose means responsive to said digital polyphase network voltage samples and said digital polyphase phasing voltage samples for generating a positive sequence network voltage vector and a positive sequence phasing voltage vector and for closing said circuit breaker in response to a predetermined relationship between said positive sequence network voltage vector and said positive sequence phasing voltage vector, and means responsive to a predetermined number of closings of said circuit breaker within a predetermined time period for blocking said reclose means from reclosing said circuit breaker.

\* \* \* \* \*